United States Patent
Arndt et al.

(10) Patent No.: US 8,404,298 B2
(45) Date of Patent: *Mar. 26, 2013

(54) WHOLE GRAIN FLOUR AND PRODUCTS INCLUDING SAME

(75) Inventors: Elizabeth A. Arndt, Omaha, NE (US); Theodore Korolchuk, Papillion, NE (US)

(73) Assignee: ConAgra Foods Food Ingredients Company, Inc., Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,009

(22) Filed: Jul. 18, 2012

(65) Prior Publication Data

US 2012/0288612 A1    Nov. 15, 2012

Related U.S. Application Data

(63) Continuation of application No. 13/088,104, filed on Apr. 15, 2011, now Pat. No. 8,252,360, which is a continuation of application No. 11/591,289, filed on Nov. 1, 2006, now Pat. No. 8,017,172, which is a continuation-in-part of application No. 11/211,864, filed on Aug. 25, 2005, now abandoned, which is a continuation-in-part of application No. 10/945,199, filed on Sep. 20, 2004, now Pat. No. 7,425,344, which is a continuation-in-part of application No. 10/738,732, filed on Dec. 17, 2003, now Pat. No. 7,419,694.

(60) Provisional application No. 60/732,046, filed on Nov. 1, 2005.

(51) Int. Cl.
*A23L 1/10* (2006.01)

(52) U.S. Cl. ......... 426/618; 426/518; 426/615; 426/622

(58) Field of Classification Search ............... 426/615, 426/622, 518, 618
See application file for complete search history.

(56) References Cited

U.S. PATENT DOCUMENTS

| | | | |
|---|---|---|---|
| 2,230,417 | A | 2/1941 | Wellinghoff |
| 2,895,831 | A | 7/1959 | Tewfic |
| 3,100,708 | A | 8/1963 | Emerson, Jr. |
| 3,462,086 | A | 8/1969 | Bertrand et al. |
| 4,017,034 | A | 4/1977 | Griffith et al. |
| 4,133,899 | A | 1/1979 | Wolffing et al. |
| 4,919,952 | A | 4/1990 | Sadaranganey et al. |
| 4,956,190 | A | 9/1990 | Chawan et al. |
| 5,066,506 | A | 11/1991 | Creighton et al. |
| 5,114,079 | A | 5/1992 | Curran |
| 5,192,028 | A | 3/1993 | Curran |
| 5,352,473 | A | 10/1994 | Chiqurupati et al. |

(Continued)

FOREIGN PATENT DOCUMENTS

| | | |
|---|---|---|
| CA | 2141974 | 8/1995 |
| CN | 1206629 A | 2/1999 |

(Continued)

OTHER PUBLICATIONS

Atwell, "An Overview of Wheat Development, Cultivation, and Production," Cargill Bake Lab, Minnetonka, MN, Cereal Foods World, vol. 46, No. 2, pp. 59-62, Feb. 2001 (4 pp.).

(Continued)

*Primary Examiner* — Helen F Heggestad
(74) *Attorney, Agent, or Firm* — Holland & Hart LLP

(57) ABSTRACT

A grain product includes a first fraction including bran and a second fraction including germ. The first fraction is milled to a first particle size of less than 500 micrometers. The second fraction is milled to a second particle size of less than 500 micrometers. The grain product is at least one of: a food product, a nutritional supplement, a dietary supplement, a fiber supplement, a digestive supplement, a functional food, and a medical food.

20 Claims, 11 Drawing Sheets

U.S. PATENT DOCUMENTS

| | | | |
|---|---|---|---|
| 5,433,966 | A | 7/1995 | Wolt |
| 5,691,921 | A | 11/1997 | Berlin |
| 6,372,281 | B1 | 4/2002 | Metzger et al. |
| 6,495,191 | B1 | 12/2002 | Maldonado |
| 6,569,483 | B2 | 5/2003 | Zohoungbobgo |
| 6,610,349 | B1 | 8/2003 | Delrue et al. |
| 6,613,372 | B1 | 9/2003 | Schlebusch et al. |
| 6,616,957 | B1 | 9/2003 | Wilhelm et al. |
| 7,258,888 | B2 | 8/2007 | Dreese et al. |
| 7,419,694 | B2 * | 9/2008 | Korolchuk ............. 426/622 |
| 7,425,344 | B2 * | 9/2008 | Korolchuk et al. ......... 426/518 |
| 8,017,172 | B2 * | 9/2011 | Arndt et al. ............. 426/622 |
| 8,053,010 | B2 | 11/2011 | Monsalve-Gonzalez et al. |
| 8,252,360 | B2 * | 8/2012 | Arndt et al. ............. 426/615 |
| 2004/0021035 | A1 | 2/2004 | Pribytkov |
| 2005/0214413 | A1 | 9/2005 | McAnalley et al. |
| 2006/0073258 | A1 | 4/2006 | Korolchuk |
| 2007/0087084 | A1 | 4/2007 | Coleman et al. |
| 2008/0171114 | A1 | 7/2008 | Rodriguez et al. |
| 2008/0261916 | A1 | 10/2008 | Jaszberenyi et al. |
| 2011/0256207 | A1 | 10/2011 | Arndt et al. |

FOREIGN PATENT DOCUMENTS

| | | |
|---|---|---|
| GB | 2 126 465 A | 9/1982 |
| JP | 62-16621 B | 4/1987 |
| JP | 5-304915 | 11/1993 |
| JP | 2001-204411 | 7/2001 |

OTHER PUBLICATIONS

Erhard-Hudson, "Unifine Flour from Azure Standard/Azure Farms," Moscow Food Co-op Producer Profile, Sep. 2001 (3 pp.).

Gap Mill GMD, Bauermeister, Inc., ConAgra-Blackwell, OK, Nov. 20, 2003 (2 pp.).

Information Offer Form, from corresponding Japanese Patent Application No. 2006-545458, May 25, 2012 (9 pp.).

International Search Report and Written Opinion, PCT/US04/42357, Jun. 15, 2005 (6 pp.).

Kim et al., "Determination of Bran Contamination in Wheat Flours Using Ash Content, Color, and Bran Speck Counts," Cereal Chem. 76(6), pp. 957-961 (1999) (5 pp.).

Marquart et al., "Whole Grains and Health Past, Present, and Future," Dept. Of Food Science and Nutrition, Quib Technical Bulletin, vol. XXV, Issue 2, pp. Feb. 1-14, 2003 (14 pp.).

McBride, Jr. et al., "Back to the Old Grinder," Agricultural Research, May 2000 (1 p.).

Pease et al., "Unifine Flour Milling, Baking and Consumer Acceptance Tests," Division of Industrial Research, The State College of Washington, Pullman, Washington, Apr. 1950 (46 pp.).

Reinach and Bernhardt, "Comparison of Different Types of Stirred Ball Mills for Ultrafine Griding of Solids," Proceeding of the 1st International Conference on Mechanochemistry, vol. 2, pp. 148-154 (1993) (7 pp.).

"The Aristocratic of Wheat," 2006 Regional Quality Report, U.S. Hard Red Spring Wheat (2006) (32 pp.).

Wu et al., "Lipophilic and Hydrophilic Antioxidant Capacities of Common Foods in the United States," Journal of Agricultural and Food Chemistry, pp. 4026-4027, May 19, 2004 (12 pp.).

Complaint, United States District Court for the District of Kansas, Civil Case No. 2:12-cv-02171, May 21, 2011 (34 pp.).

Answer to Complaint, United States District Court for the District of Kansas, Civil Case No. 2:12-cv-02171, May 14, 2012 (7 pp.).

Information about Related Patents and Patent Applications, see the section below having the same title.

Information about Prior and Concurrent Proceedings, see the section below having the same title.

U.S Appl. No. 13/552,009, filed Jul. 18, 2012, Whole Grain Flour and Products Including Same.

U.S. Appl. No. 08/583,246, filed Jan. 5, 1996.

U.S. Appl. No. 08/194,672, filed Feb. 14, 1994, Ultra-Fine Whole Wheat Flours and Food Products Made Therefrom.

U.S. Appl. No. 07/868,012, filed Apr. 13, 1992, Method for Increasing Stability and Bake Absorption of a Bread Baking Wheat Flour and Resulting Dough.

U.S. Appl. No. 07/819,886, filed Jan. 13, 1992, Method for Increasing Stability and Bake Absorption of a Bread Baking Wheat Flour and Resulting Dough

* cited by examiner

NUTRITIONAL COMPARISION OF REFINED WHEAT FLOUR AND WHOLE-GRAIN WHEAT FLOUR
(USDA National Nutrient Database for Standard Reference, Release 15 (8/2002)

|  | Refined Wheat Flour | Whole Wheat Flour |
|---|---|---|
|  | 12% Moisture Basis | |
| % Protein* | 10.33% | 13.70% |
| % Fat* | 0.98% | 1.87% |
| % Minerals* | 0.50% | 1.60% |
| % Total Carbohydrates* | 76.31% | 72.57% |
| % Total Dietary Fiber* | 2.70% | 12.20% |

FIG. 2

| Wheat Variety = Platte | Particle Size Alpine Air Jet On US 100 Wire | Particle Size Alpine Air Jet On US 200 Wire | Particle Size Alpine Air Jet On US 325 Wire | Particle Size Alpine Air Jet On US 400 Wire |
|---|---|---|---|---|
| Fine Fraction (Refined wheat flour) Step 1 of 2-step process | 1.4 | 47.0 | 77.2 | 98.0 |
| Ultrafine-Milled Coarse Fraction Step 2 of 2-step process | 22.0 | 43.4 | 57.6 | 67.0 |
| Ultrafine-Milled Whole-Grain Wheat Flour (Blend of Fine Fraction and Ultrafine-Milled Coarse Fraction) | 2.0 | 48.0 | 78.4 | 98.4 |

FIG. 7

NUTRITIONAL COMPARISION OF REFINED WHEAT FLOUR, ULTRAFINE-MILLED WHOLE GRAIN WHEAT FLOUR AND ULTRAFINE COARSE FRACTION

| | Refined Wheat Flour[1] | Ultrafine-Milled Whole-Grain Wheat Flour[1] | Ultrafine-Milled Coarse Fraction[2] |
|---|---|---|---|
| | | 12% Moisture Basis | |
| % Protein | 10.33% | 13.70% | 18.40% |
| % Fat | 0.98% | 1.87% | 6.10% |
| % Minerals | 0.50% | 1.60% | 5.80% |
| % Total Carbohydrates | 76.31% | 72.57% | 57.70% |
| % Total Dietary Fiber | 2.70% | 12.20% | 38.60% |

[1] USDA National Nutrient Database for standard reference, Release 15 (8/2002)
[2] ConAgra Foods data, CF1071503 hard red winter

FIG. 8

| Total Antioxidant Capacity Of Wheat Milling Fractions | |
|---|---|
| | umole TE/100 g |
| ➢ Refined Wheat Flour | 1,000(n=1) |
| ➢ Refined Wheat Flour (Platte variety) | 1,900(n=1) |
| ➢ Ultrafine-milled Whole-Grain Wheat Flour (Platte variety) | 2,800(n=1) |
| ➢ Wheat Bran | 3,600(n=2) |
| ➢ Coarse fraction (Platte variety) | 6,700(n=1) |
| ➢ Ultrafine-Milled Coarse Fraction (Platte variety) | 7,400(n=1) |
| ➢ Wheat germ | 8,400(n=6) |

FIG. 9a

| Total Antioxidant Capacity Comparison Wheat Fractions vs. Fruits & Vegetables | |
|---|---|
| | umole TE/100 g |
| Artichoke | 9,409 |
| Dried Plums | 8,578 |
| Ultra-fine milled coarse fraction (Platte variety) | 7,400 |
| Blueberries, Culivated | 6,220 |
| Strawberries | 3,577 |
| Raisins | 3,037 |
| Spinach | 2,640 |
| Broccoli, Raw | 1,590 |
| Tomatoes, Raw | 337 |
| Brussel Sprouts | 980 |

Wheat Germ 8,400 → Ultra-fine milled coarse fraction (Platte variety)
Wheat Bran 3,600 → Strawberries
Refined Flour 1,000 → Tomatoes, Raw

FIG. 9b

Microbial Loads

| Ingredient | Aerobic Plate Count<br>CFU/G | Coliforms – Petrifilm<br>CFU/G |
|---|---|---|
| Ultrafine-Milled Whole-Grain Wheat Flour, Platte HWW* | 20,000 | 530 |
| Ultrafine-Milled Whole-Grain Wheat Flour, Platte HWW | 20,000 | 1,800 |
| Average | 20,000 | 1,165 |
| Coarse Fraction (Millfeed, Platte HWW) | 130,000 | 1,200 |
| Coarse Fraction (Millfeed, Platte HWW) | 60,000 | 1,200 |
| Average | 95,000 | 1,200 |
| Ultrafine-Milled Coarse Fraction (Millfeed, Platte HWW) | 10,000 | 1,300 |
| Ultrafine-Milled Coarse Fraction (Millfeed, Platte HWW) | 10,000 | 500 |
| Average | 10,000 | 900 |

*Platte HWW = Platte Hard White Winter Wheat

FIG. 10

WHOLE GRAIN FLOUR AND PRODUCTS INCLUDING SAME

CROSS-REFERENCE TO RELATED PATENT APPLICATIONS

This patent application is a continuation of U.S. patent application Ser. No. 13/088,104, titled "Whole Grain Flour and Products Including Same," filed on 15 Apr. 2011, now U.S. Pat. No. 8,252,360, published as U.S. Pat. App. Pub. No. 2011/0256207, which is a continuation of U.S. patent application Ser. No. 11/591,289, titled "Whole Grain Flour and Products Including Same," filed on 1 Nov. 2006, issued as U.S. Pat. No. 8,017,172, which claims the benefit of U.S. Provisional Pat. App. No. 60/732,046, titled "A Process for Producing an Ultrafiber Product and Health and Wellness Products Thereof," filed 1 Nov. 2005, and is a continuation-in-part of U.S. patent application Ser. No. 11/211,864, titled "A Process for Producing an Ultrafine-Milled Whole-Grain Wheat Flour and Products Thereof," filed on 25 Aug. 2005, now abandoned, published as U.S. Pat. App. Pub. No. 2006/0073258, which is a continuation-in-part of U.S. patent application Ser. No. 10/945,199, titled "Process for Producing a Milled Whole-Grain Wheat Flour and Products Thereof," filed on 20 Sep. 2004, issued as U.S. Pat. No. 7,425,344, which is a continuation-in-part of U.S. patent application Ser. No. 10/738,732, titled "Process for Producing an Ultrafine-Milled Whole-Grain Wheat Flour and Products Thereof," filed on 17 Dec. 2003, issued as U.S. Pat. No. 7,419,694, all of which are incorporated by reference herein in their entirety.

FIELD

The present invention relates to the field of milling products and particularly to a whole grain flour and products including same.

BACKGROUND

Refined wheat flour (white flour) is used to produce a wide range of popular bakery and snack products. Products made from refined wheat flour traditionally have a uniform, light-colored appearance and smooth (non-gritty) texture. Comparatively, products made with traditional whole grain wheat flour, tend to have a coarser, more dense texture and a darker, less consistent appearance (ex. —visible bran specks). Currently existing whole grain wheat flours (i.e., whole wheat flours) may be prepared, for example, by grinding cleaned wheat, other than durum wheat and red durum wheat, which, once ground, has a particle size wherein not less than 90% passes through a 2.36 millimeter (U.S. Wire 8) sieve and not less than 50% passes through an 850 micrometer (U.S. Wire 20) sieve. In whole wheat flour (whole grain wheat flour), the proportions of the natural constituents in the wheat, other than moisture, remain unaltered as compared to the wheat kernels. Bread is considered to be 100% whole wheat when the dough is made from whole grain wheat flour, bromated whole wheat flour, or a combination of these. No refined wheat flour is used in whole wheat products. Whole grain wheat flour has increased nutritional value compared to refined wheat flour because it includes the entire wheat kernel, (i.e., includes bran, germ, and endosperm) rather than primarily just the endosperm, as shown in FIGS. 1 and 2. Thus, whole grain wheat flour is higher in fiber, protein, lipids, vitamins, minerals, and phytonutrients, including phenolic compounds and phytates, when compared to refined wheat flour. Further, compared to whole grain wheat flour, refined wheat flour is higher in calories and starch, while containing only about a fifth of the dietary fiber found in whole grain wheat flour and less protein than whole grain wheat flour, as shown in FIGS. 1 and 2. Even enriched refined wheat flour, which may contain thiamin, riboflavin, niacin, folic acid and iron added at or above the levels found in the wheat kernel, does not include as much fiber, minerals, lipids, and phytonutrients, as are found in whole grain wheat flour.

Recently, health practitioners have been promoting the benefits of whole grain foods. The importance of increasing whole grain consumption is reflected in the changes in recommendations set forth by government and health organization expert groups. In the Healthy People 2010 Report (National Academy Press, 1999), it is recommended that for a 2,000 calorie diet individuals two years and older should consume at least six daily servings of grain products with at least three being whole grains. In the 2005 Dietary Guidelines for Americans it is recommended that consumers should eat 3 or more ounce equivalents of whole grain foods each day, with the rest coming from enriched or whole grain flours. In general, at least half of the intake should come from whole grains. The American Heart Association, American Diabetes Association and the American Cancer Society also make specific recommendations regarding increasing the consumption of whole grains.

Despite the well-documented nutritional advantages of eating whole grain products as compared to refined flour products, consumers often prefer the consistent texture and light color of products containing refined wheat flour. Currently, in the United States, consumption of white bread made from refined wheat flour is greater than that of whole wheat bread. Such consumer preference for refined flour products may limit the use of current whole grain wheat flours in bakery and snack products.

Another limitation of current whole grain flours involves their shelf life. The bran and germ of whole grain wheat flour contain enzymes such as lipase, lipoxygenase, and peroxidase. These enzymes are important during early plant development, but their presence in the whole grain wheat flour reduces the shelf life of the whole grain wheat flour.

Previous "traditional" whole grain flourmills (as shown in FIG. 3) are only capable of producing a few types of granular whole grain flour products and have not been able to produce whole grain wheat flour having similar baking attributes and resulting in products similar to refined wheat flour. Using current technology, the finest granulation of whole grain wheat flour that is available in the marketplace has a particle size larger than refined wheat flour. Attempts have been made to produce a whole grain wheat flour with a particle size comparable to refined wheat flour, however, these attempts generally have not been economically feasible, and did not result in a particle size that was comparable to refined wheat flour. The current processes are uneconomical due to the energy usage and capitalization required to grind the millfeed using the rollermills, hammermills and bran slicers typically implemented in such processes. Therefore, such processes cannot economically achieve the desired granulation.

Given that a number of popular consumer products made with refined wheat flour are low in fiber and do not have the nutritional benefits of their respective whole grain counterparts, it would be desirable to develop a whole grain wheat flour that can be used in these products, yet still allow these products to maintain a desirable texture and appearance that is acceptable to consumers. Such products would have enhanced nutritional value and increased shelf life, while retaining the qualities (ex. —baking attributes, appearance, color, taste, texture) that appeal to a large segment of consumers.

Further, in the United States, individuals typically consume 12-15 grams of fiber per day, which is half or less of the recommended level. Many current fiber supplements have an undesirable texture, taste and have limited nutritional value beyond their fiber content. Current fiber supplements including isolated fibers may have a less than desired nutrient content. Therefore, it would also be desirable to develop nutritious, high fiber food products and fiber supplements which have a texture and taste more palatable to a number of consumers.

SUMMARY

Accordingly, an embodiment of the present invention is directed to a whole grain flour, including: a refined flour constituent; and a coarse fraction, the coarse fraction including at least one of bran and germ, the coarse fraction being blended with the refined flour constituent, wherein 98% of particles by weight of the whole grain flour are less than 212 micrometers, and wherein enzymes found within the bran and germ are inactivated in order to stabilize the whole grain flour.

A further embodiment of the present invention is directed to a coarse fraction milled from an unmilled grain, the coarse fraction, including: a first fraction including bran, the first fraction being milled to a first particle size of less than 500 micrometers; and a second fraction including germ, the second fraction milled to a second particle size of less than 500 micrometers.

An additional embodiment of the present invention is directed to a grain product, including: a first fraction including bran, the first fraction being milled to a first particle size of less than 500 micrometers; and a second fraction including germ, the second fraction milled to a second particle size of less than 500 micrometers, wherein the grain product is at least one of, a food product, a nutritional supplement, a dietary supplement, a fiber supplement, a digestive supplement, a functional food, and a medical food.

DRAWINGS

The numerous advantages of the present invention may be better understood by those skilled in the art by reference to the accompanying figures in which:

FIG. 2 is a table comparing the nutritional content of refined wheat flour and whole grain wheat flour, the percentage of protein, fat, ash and moisture being determined by proximate analysis and then subtracted from 100, the result being considered the percentage of total carbohydrates, the percentage of total dietary fiber being an actual measurement;

FIG. 7 is a table listing particle size distribution for a fine fraction (refined wheat flour), a coarse fraction, and an ultrafine-milled whole grain wheat flour in accordance with an exemplary embodiment of the present invention;

FIG. 8 is a table comparing nutritional data of refined wheat flour, versus an ultrafine-milled whole grain wheat flour, and an ultrafine-milled coarse fraction in accordance with an exemplary embodiment of the present invention;

FIG. 9A is a table listing antioxidant capacities of wheat milling fractions in accordance with an exemplary embodiment of the present invention;

FIG. 9b is a table comparing antioxidant capacities of wheat fractions versus fruits and vegetables in accordance with an exemplary embodiment of the present invention;

Figure 11:
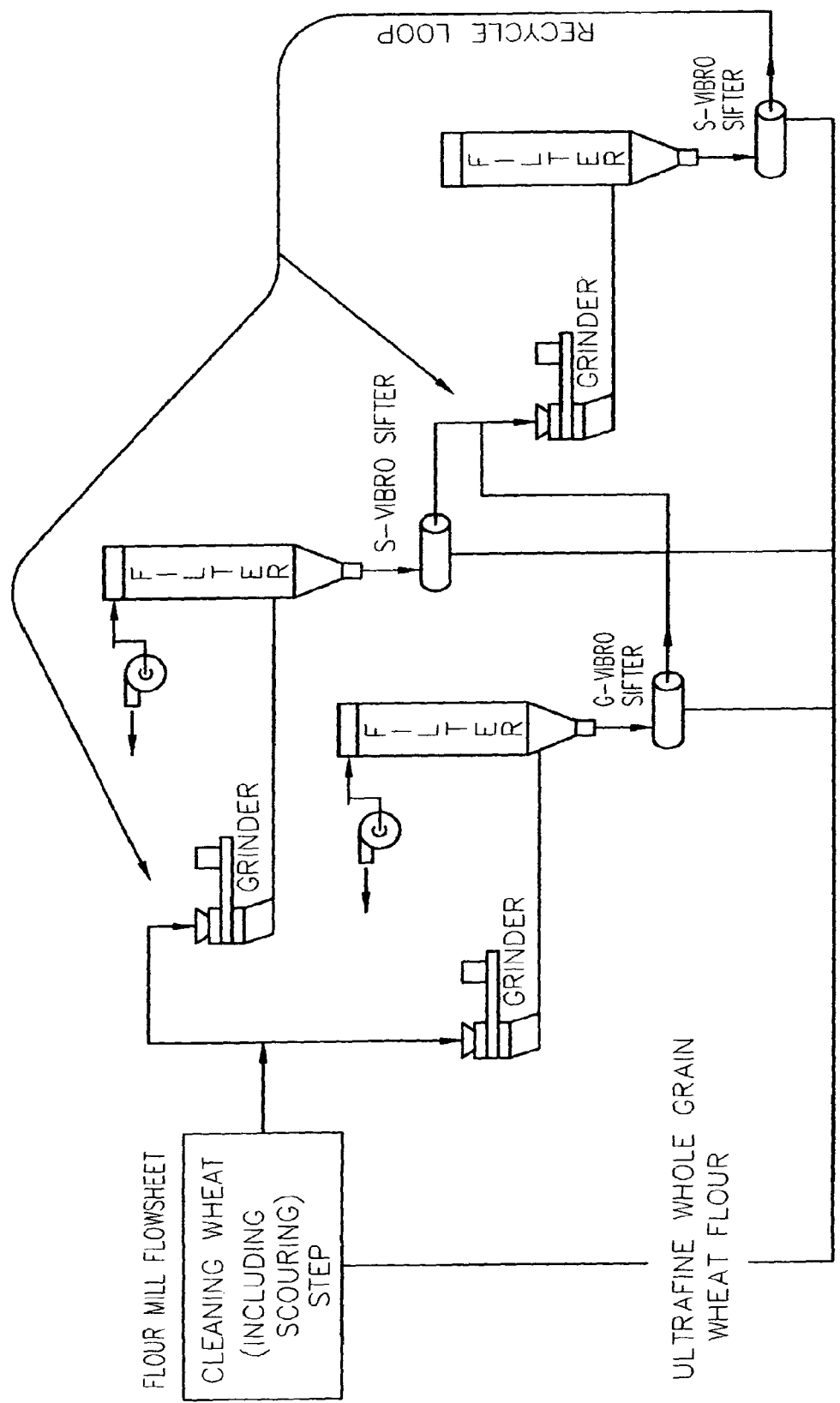

FIG. 10 is a table listing microbiological load results for an ultrafine-milled whole grain wheat flour, a coarse fraction and an ultrafine-milled coarse fraction in accordance with an exemplary embodiment of the present invention; and, FIG. 11 is a detailed flowsheet of a high capacity gap milling process in accordance with an exemplary embodiment of the present invention, illustrating the single stream milling process where bran, germ, and endosperm are ground together.

DETAILED DESCRIPTION

In an exemplary embodiment, the present invention is directed to a whole grain flour (ex. —an ultrafine-milled whole grain flour, such as an ultrafine-milled whole grain wheat flour; a whole grain wheat flour, or a flour made from about 100% of the grain). For example the grain may include, but is not limited to at least one of: wheat, sorghum, milo, triticale, emmer, einkorn, spelt, oats, corn, rye, barley, rice, millet, buckwheat, quinoa, amaranth, African rice, popcorn, teff, canary seed, Job's tears, wild rice, tartar buckwheat, variants thereof, and mixtures thereof. The whole grain flour includes a refined flour constituent (ex. —refined wheat flour or refined flour) and a coarse fraction (ex. —an ultrafine-milled coarse fraction). In a current embodiment, the nutritional composition of the whole grain flour of the present invention may be identical to that of whole grain wheat flour. (as shown in FIG. 8). For example, the whole grain flour of the present invention may contain about 8-17% protein, about 2% fat, about 2% ash (minerals), and about 60-80% total carbohydrates, including about 12% total dietary fiber. Thus, the whole grain wheat flour (ex. —ultrafine-milled whole grain wheat flour) of the present invention contains less protein, fiber, vitamins, minerals, and phytonutrients, compared to the coarse fraction of the present invention. (FIG. 8).

Refined wheat flour may be flour which is prepared, for example, by grinding and bolting cleaned wheat other than durum wheat and red durum wheat. The Food and Drug Administration (FDA) requires flour to meet certain particle size standards in order to be included in the category of refined wheat flour. The particle size of refined wheat flour is described as flour in which not less than 98% passes through a cloth having openings not larger than those of woven wire cloth designated "212 micrometers (U.S. Wire 70)". In an exemplary embodiment, as shown in FIG. 8, the refined wheat flour is typically comprised of about 10-11% protein, about 1% fat, about 76% total carbohydrates, which includes about 2.5-3% dietary fiber, and about 0.5% ash (minerals). In present embodiments, the refined flour constituent may be enriched flour. According to the FDA Code of Federal Regulations (CFR), enriched flour is refined wheat flour which contains 2.9 mg of thiamin, 1.8 mg of riboflavin, 24 mg of niacin, 0.7 mg of folic acid and 20 mg of iron added per pound of refined wheat flour. Enriched flour may also contain calcium in the amount of 960 mg per pound of refined wheat flour. In order to meet U.S. FDA guidelines, enriched flour may not contain more than 5% by weight of wheat germ or partly defatted wheat germ.

In a current embodiment, the coarse fraction includes at least one of: bran and germ. For instance, the germ is an embryonic plant found within the wheat kernel. The germ includes lipids, fiber, vitamins, protein, minerals and phytonutrients, such as flavonoids. The bran includes several cell layers and has a significant amount of lipids, fiber, vitamins, protein, minerals and phytonutrients, such as flavonoids. Further, the coarse fraction may include an aleurone layer which also includes lipids, fiber, vitamins, protein, minerals and phytonutrients, such as flavonoids. The aleurone layer, while technically considered part of the endosperm, exhibits many of the same characteristics as the bran and therefore is typically removed with the bran and germ during the milling process. The aleurone layer contains proteins, vitamins and phytonutrients, such as ferulic acid. Although the bran and the germ only make up about 18% of the wheat kernel by weight, they account for about 75% of the nutritional value of the wheat. In a current embodiment, the coarse fraction of the present invention may include: 38% fiber, 18% protein, healthy lipids, B vitamins, vitamin E, phosphorus, magnesium, selenium, manganese, zinc, copper, chromium, phytonutrients (phenolic acids, flavonoids, etc.).

Further, in an exemplary embodiment, the coarse fraction may be blended with the refined flour constituent. Preferably, the coarse fraction is homogenously blended with the refined flour constituent. Homogenously blending the coarse fraction and refined flour constituent may help reduce stratification of the particles by size during shipping. In present embodiments, the coarse fraction may be mixed with the refined flour constituent to form the whole grain flour of the present invention, thus providing a whole grain flour with increased nutritional value, fiber content, and antioxidant capacity as compared to refined flour. For example, the coarse fraction or whole grain flour of the present invention may be used in various amounts to replace refined or whole grain flour in baked goods, snack products, and food products. The whole grain flour of the present invention (i.e. —ultrafine-milled whole grain flour) may also be marketed directly to consumers for use in their homemade baked products. In an exemplary embodiment, a granulation profile of the whole grain flour is such that 98% of particles by weight of the whole grain flour are less than 212 micrometers. For example one embodiment might have a first portion where 2-30% of the particles by weight are between 150 and 212 micrometers, a second portion including the first portion where 30-90% of the particles are more than 75 micrometers, a third portion where including the second portion where 65-95% of the particles by weight are more than 38 micrometers, and a fourth portion where 0-30% of the particles by weight are less than 38 micrometers. Another embodiment might have a first portion where 0-35% of the particles by weight are less than 38 micrometers, a second portion where 45-60% of the particles by weight have are between 38 and 75 micrometers, a third portion where 30-50% of the particles by weight are between 75-150 micrometers, and a fourth portion where 2-30% of the particles by weight are between 150 and 212 micrometers. In a further embodiment, the whole grain flour may include: a first portion including bran in a first proportion of at least substantially 14-16% by weight of the whole grain flour; a second portion including germ in a second proportion of at least substantially 2-3% by weight of the whole grain flour; and a third portion including endosperm in a third proportion of at least substantially 80-85% by weight of the whole grain flour.

In present embodiments, the refined flour constituent may have a first protein content in a first proportion by weight of the refined flour constituent. The coarse fraction may have a second protein content in a second proportion (preferably, at least substantially 18%) by weight of the coarse fraction. The blend of the refined flour constituent and coarse fraction may have a third protein content in a third proportion by weight of the blend, the third proportion being greater than the first proportion.

In further embodiments, whole grain flour of the present invention allows for increased antioxidant capacity over refined flour. Antioxidants may play a role in reducing the risk of cancer and other diseases. Thus, it has been recommended that individuals consume foods such as fruits, vegetables and whole grains that contain antioxidants. The antioxidant activity of food products can be measured by the ORAC (Oxygen Radical Absorbance Capacity) assay. The ORAC assay measures hydrophilic and hydrophobic antioxidant capacities of a food using fluorescein as the fluorescent probe and 2,2'-azobis(2-amidinopropane)dihydrochloride as the peroxyl radical generator. Using the ORAC assay, the total antioxidant capacity, including the capacity due to the nutritive (Vitamins A, C, and E) and other phytonutrients, including flavonoids, phenolic acids, and carotenoids in a food product can be readily determined. Antioxidants, such as flavonoids, may assist the body in helping reduce the risk of cancer. In a present embodiment, the refined flour constituent may have a first oxygen radical absorption capacity. Further, the coarse fraction may have a second oxygen radical absorption capacity. Preferably, the oxygen radical absorption capacity of the coarse fraction is at least 7,400 micromole Trolox Equivalents (TE)/100 g, which is comparable to the antioxidant capacity of wheat germ (8,400 micromole TE/100 g), and about three times greater than the average antioxidant capacity of refined wheat flour (1,450 micromole TE/100 g), (FIG. 9a). However, the oxygen radical absorption capacity of the coarse fraction may be approximately 7,400 micromole TE/100 g, such as 6,700 micromole TE/100 g, prior to milling. Further, the blend of the refined flour constituent and coarse fraction (ex. —the whole grain flour of the present invention) may have a third oxygen radical absorption capacity that is greater than the first oxygen radical absorption capacity. For instance, the oxygen radical absorption capacity of the whole grain flour of the present invention may be 2,800 micromole TE/100 g. Use of the coarse fraction or whole grain flour in bakery, snack, and food products can increase the antioxidant capacity of the products. When compared on an equal weight basis with various fruits and vegetables, the antioxidant capacity of the coarse fraction is greater than blueberries, raisins, strawberries, spinach, broccoli and tomatoes. Of the fruits and vegetables tested, only artichokes and dried plums had a higher antioxidant capacity (FIG. 9b). The increase in the antioxidant capacity of the coarse fraction of the present invention versus the coarse fractions of currently existing flours is due to the coarse fraction of the present invention having a comparatively lower moisture content.

In still further embodiments, the refined flour constituent may have a first fiber content in a first proportion by weight of the refined flour constituent. The coarse fraction may have a second fiber content in a second proportion (preferably at least substantially 20%) by weight of the coarse fraction and the blend of the refined flour constituent and coarse fraction (ex—the whole grain flour of the present invention) may have a third fiber content in a third proportion by weight of the blend that is greater than the first proportion.

In current embodiments, the refined flour constituent may have a first carbohydrate content, the coarse fraction may have a second carbohydrate content, and the blend of the refined flour constituent and coarse fraction may have a third carbohydrate content, the third carbohydrate content being less than the first carbohydrate content. Alternatively, the refined flour constituent may have a first carbohydrate content and the blend of the refined flour constituent and the coarse fraction may have a second carbohydrate content, with the second carbohydrate content being less than the first carbohydrate content.

In further embodiments, the refined flour constituent may have a first ash content, the coarse fraction may have a second ash content and the blend of the refined flour constituent and coarse fraction may have a third ash content of approximately 1.0-4.0% by weight of the blend of the refined flour constituent and coarse fraction. The ash content of flour is a measurement of the minerals present in the flour. Flour samples are incinerated and the ash that remains after incineration represents the minerals present in the flour. Wheat flours with a high mineral content will have a higher percent ash than wheat flours with a lower mineral content. Therefore, it follows that whole wheat flours will have a higher ash content than refined flours.

In still further embodiments, the refined flour constituent may have a first calorie density and the blend of the refined flour constituent and the coarse fraction (ex—the whole grain flour of the present invention) may have a second calorie density, with the second calorie density being less than the first calorie density. Because, the coarse fraction/refined flour blend has a higher insoluble fiber content, the coarse fraction/refined flour blend has a lower calorie density than the refined flour. Further, products which include the whole grain flour of the present invention may have a lowered calorie density due to the higher water absorption/retention as compared to refined wheat flour.

In exemplary embodiments, the coarse fraction (ex. —ultrafine-milled coarse fraction) is milled from an unmilled grain and includes a first fraction, which includes bran. The coarse fraction may further include a second fraction, which includes germ. In a current embodiment, the first fraction and second fraction of the coarse fraction may be milled to a particle size of less than 500 micrometers. For instance, the coarse fraction of the present invention may contain about 12% protein, about 7% fat, about 60-80% carbohydrates, and about 40% dietary fiber. The ash (mineral) content of the coarse fraction of the present invention may be about 6%, and may have an antioxidant capacity of about 7,400 micromoles Trolox Equivalents (TE)/100 g. (FIG. 8). Further, grain particle distribution of the coarse fraction may be substantially homogenous. In additional embodiments, the whole grain flour and/or the coarse fraction may include, but is not limited to at least one of: wheat, sorghum, milo, triticale, emmer, einkorn, spelt, oats, corn, rye, barley, rice, millet, buckwheat, quinoa, amaranth, African rice, popcorn, teff, canary seed, Job's tears, wild rice, tartar buckwheat, variants thereof, and mixtures thereof. In embodiments in which the whole grain flour and/or the coarse fraction includes wheat, the wheat may be durum, hard red spring, hard red winter, soft red spring, soft red winter, hard white, soft white, unclassed wheat, and mixed wheat.

Figure 1:
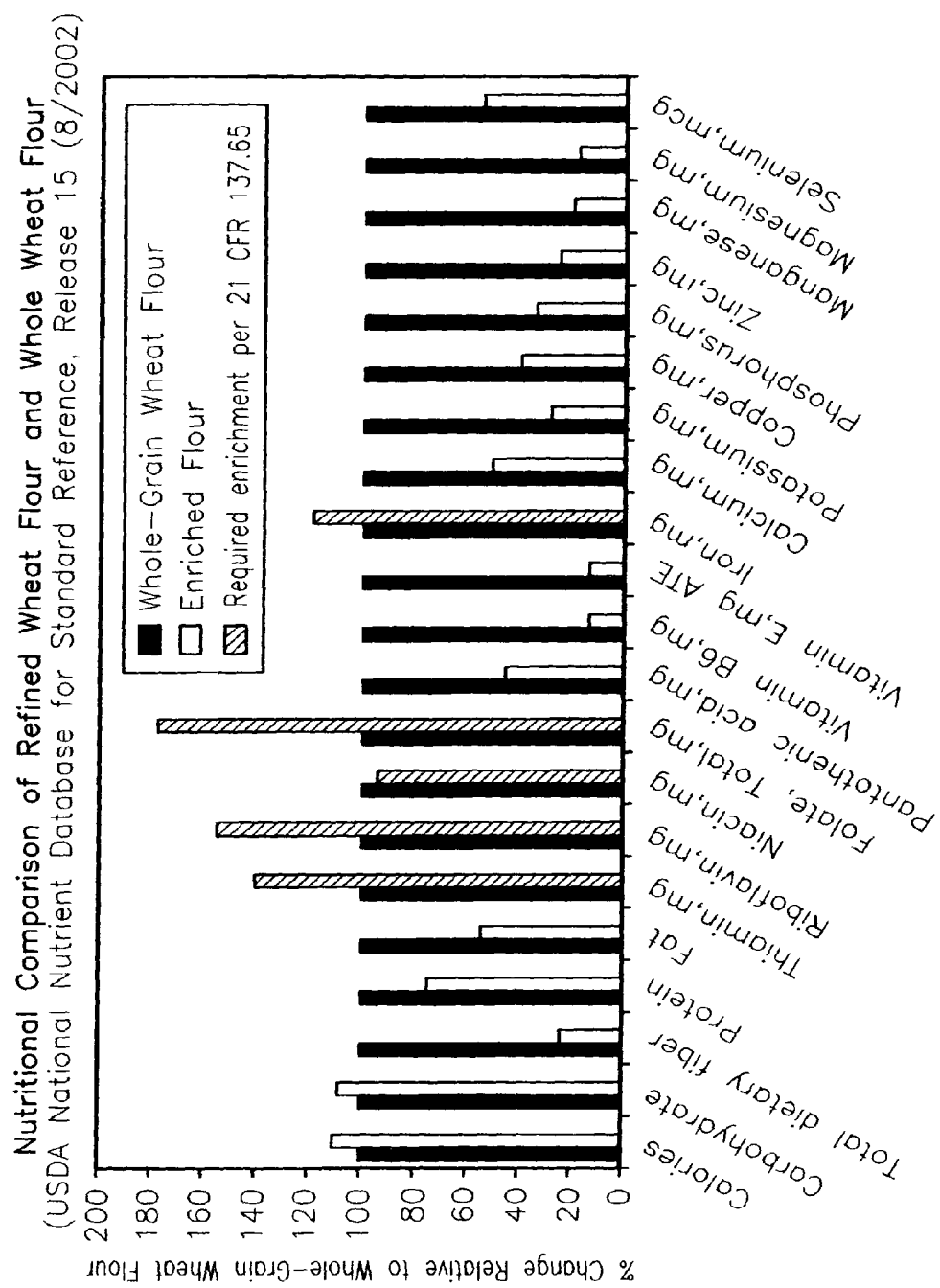
FIG. 1 is a bar graph nutritional comparison of refined wheat flour and whole grain wheat flour.
Figure 3:
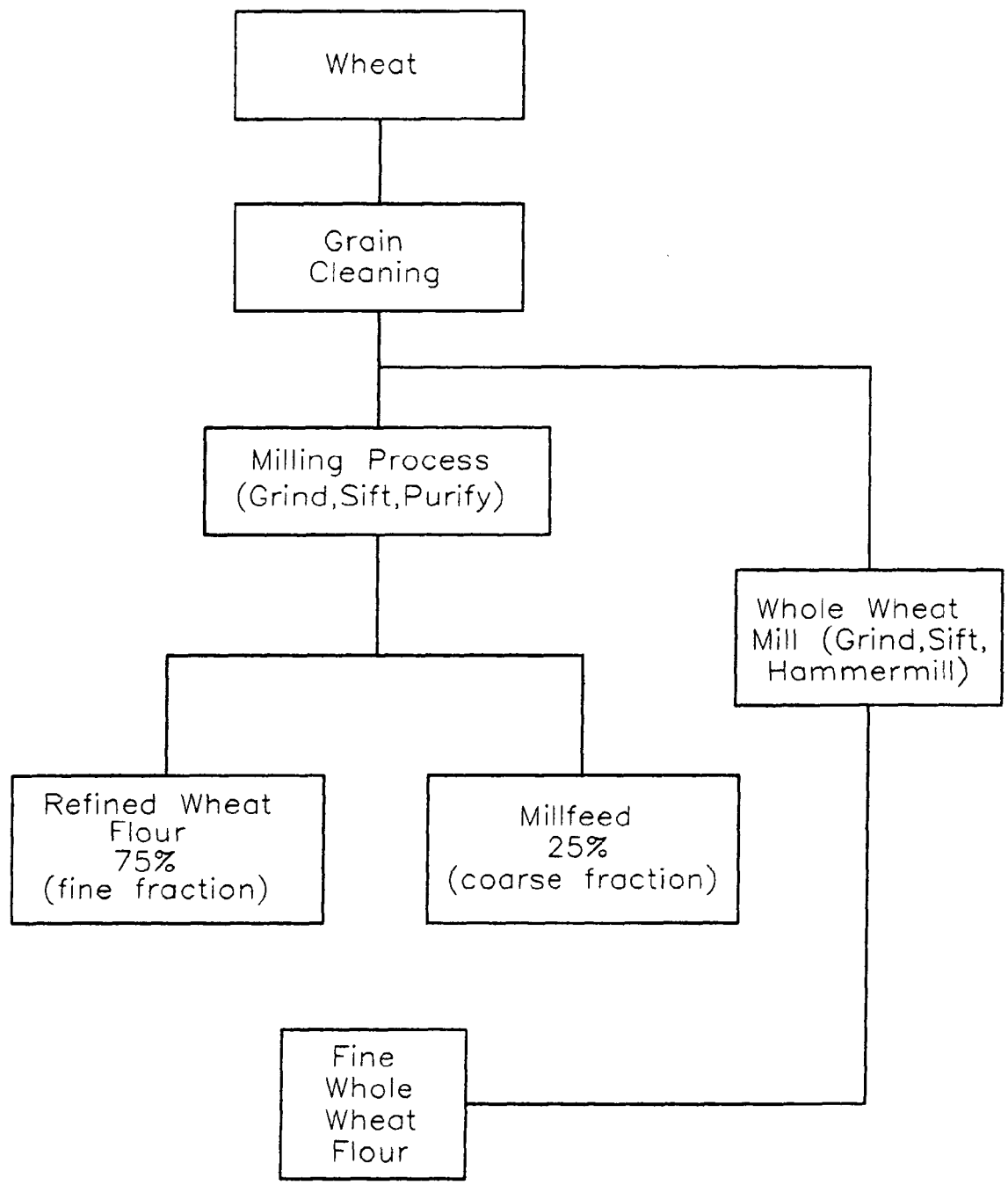
FIG. 3 is a flow chart of a traditional refined wheat flour milling process and a traditional whole wheat milling process.
Figure 4:
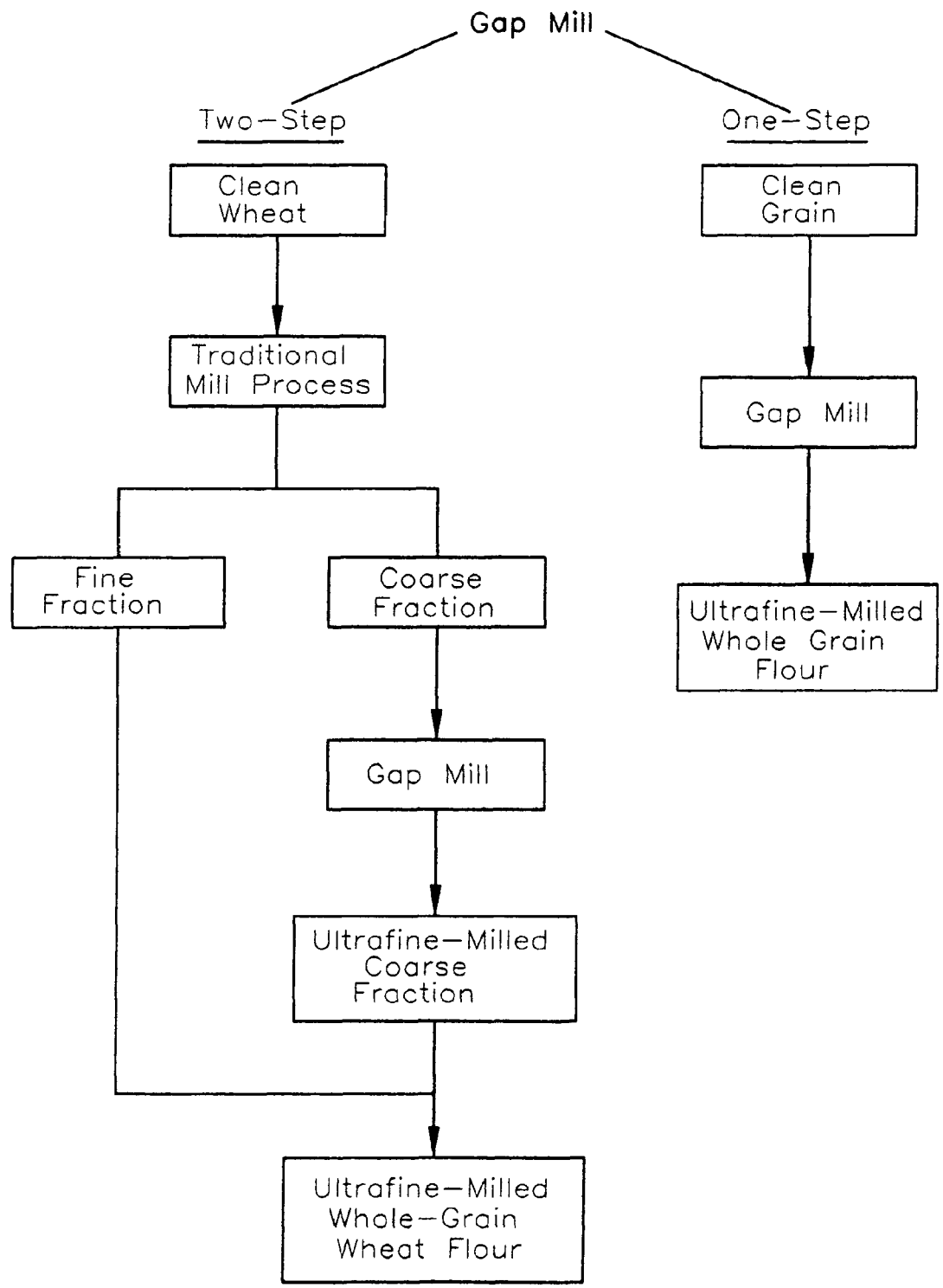
FIG. 4 is a flow chart of a gap milling process illustrating one-step and two-step processes in accordance with exemplary embodiments of the present invention.
Figure 5:
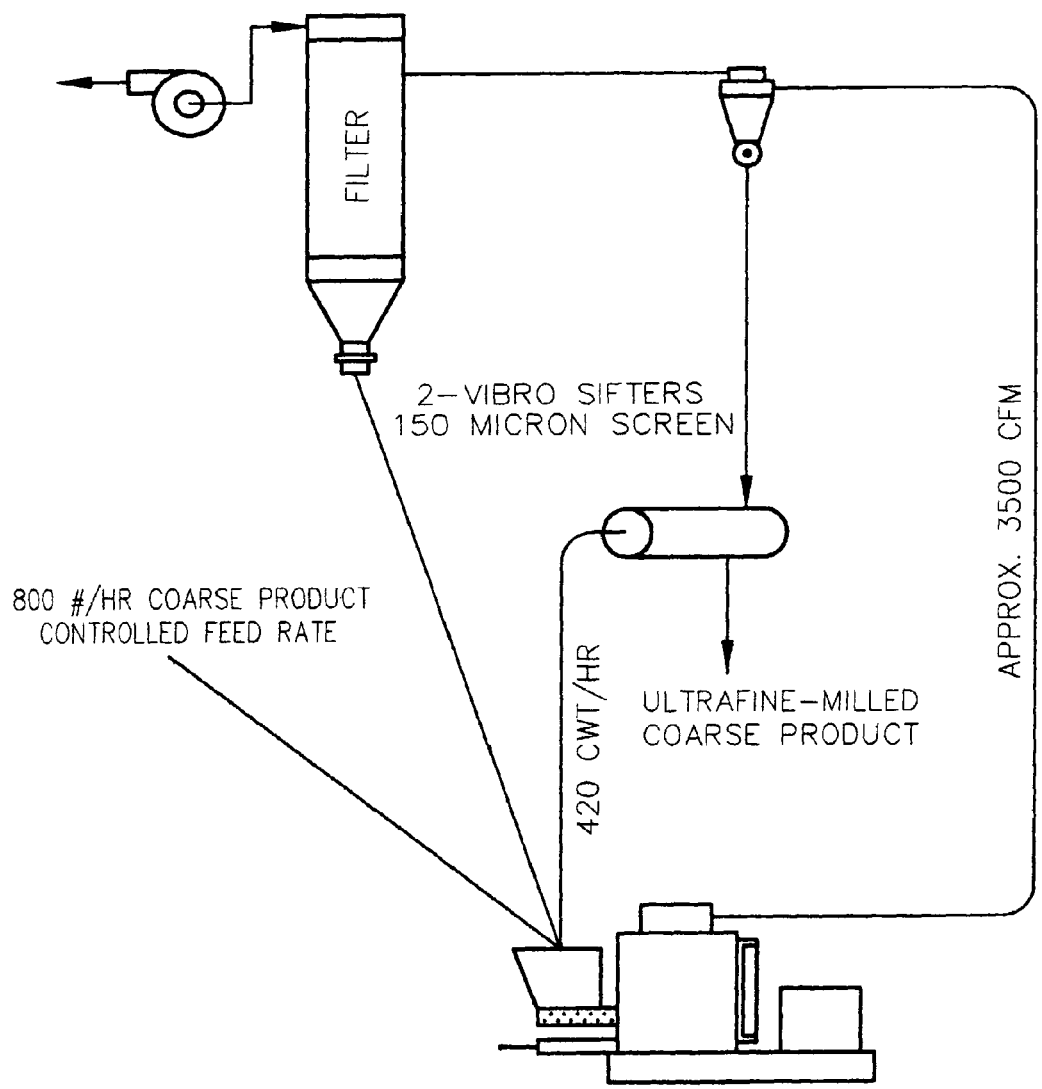
FIG. 5 is a detailed flowsheet of a gap mill process in accordance with an exemplary embodiment of the present invention.
Figure 6:
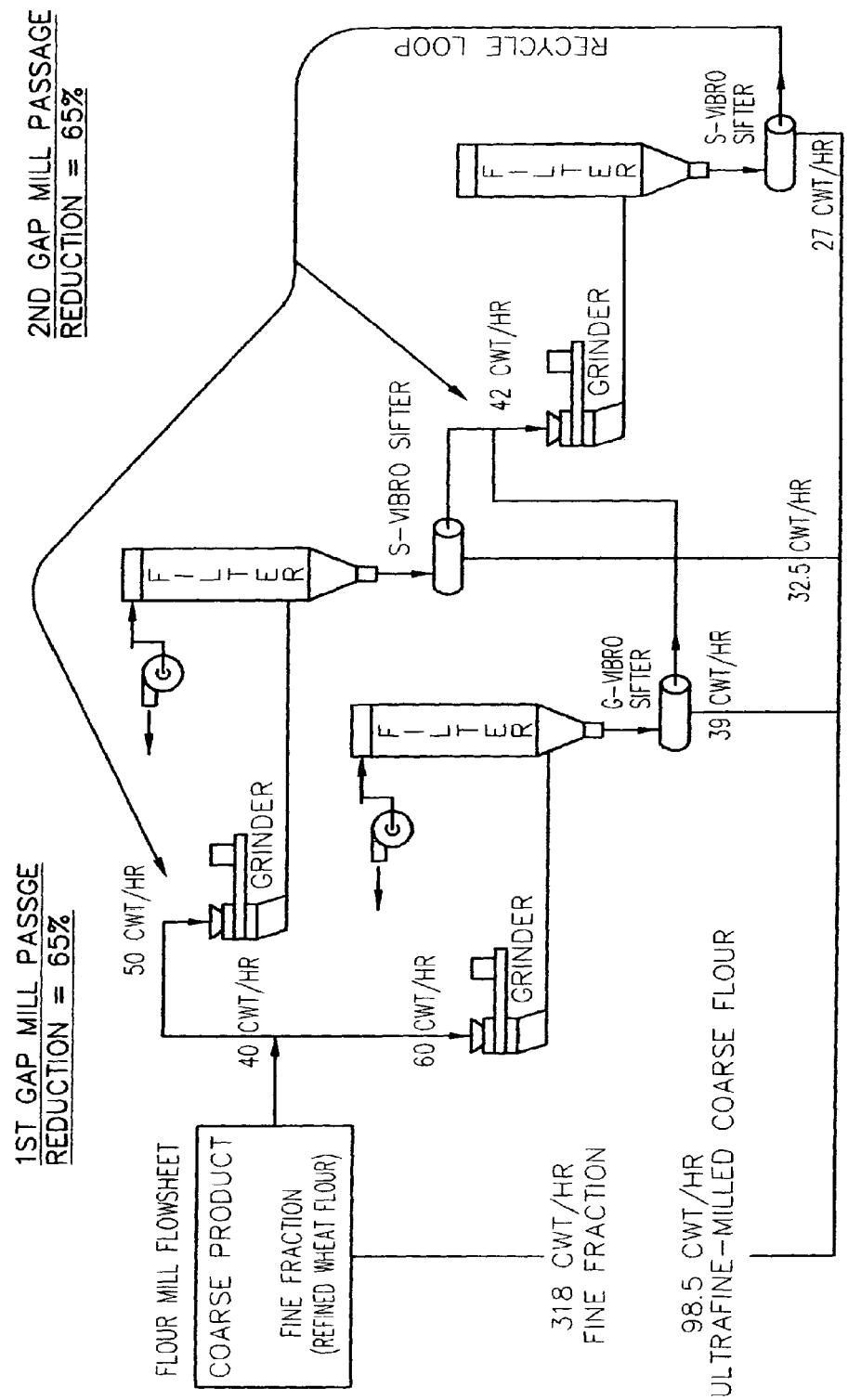
FIG. 6 is a detailed flowsheet of a high capacity gap mill process in accordance with an exemplary embodiment of the present invention, the flowsheet further illustrating two passage gap mills including a recycling process of the present invention.

In further embodiments, enzymes found within the bran and germ of the whole grain flour and/or coarse fraction are inactivated in order to stabilize the whole grain flour and/or coarse fraction. It is contemplated by the present invention that inactivated may also mean inhibited, denatured, or the like. Stabilization is a process that uses steam, heat, radiation, or other treatments to inactivate the enzymes found in the bran and germ layer. Naturally occurring enzymes in the bran and germ will catalyze changes to compounds in the flour, adversely affecting the cooking characteristics of the flour and the shelf life. Inactivated enzymes do not catalyze changes to compounds found in the flour, therefore, flour that has been stabilized retains its cooking characteristics and has a longer shelf life. For example, the present invention may implement a two-stream milling technique, as shown in FIG. 4, to grind the coarse fraction. In a present embodiment, after the coarse fraction has been separated from the refined flour, the coarse fraction is stabilized. Once the coarse fraction is separated and stabilized, the coarse fraction is then ground through a grinder, preferably a gap mill, to form a coarse fraction having a particle size distribution less than or equal to about 500 micrometers. (FIG. 4). In an exemplary embodiment, the gap mill tip speed normally operates between 115 m/s to 144 m/s, the high tip speed generates heat. The heat generated during the process and the airflow lead to a decrease in the microbial load of the coarse fraction as shown in FIG. 10. In further embodiments, prior to grinding in a gap mill, the coarse fraction may have an average aerobic plate count of 95,000 colony forming units/gram (cfu/g) and an average coliform count of 1,200 cfu/g. After passing through the gap mill the coarse fraction may have an average aerobic plate count of 10,000 cfu/g and an average coliform count of 900 cfu/g. Thus, the microbial load may be noticeably decreased in the coarse fraction of the present invention. After sifting, any ground coarse fraction having a particle size greater than 500 micrometers may be returned to the process for further milling.

In present embodiments, the unmilled grain may have a first aerobic plate count, the first fraction of the coarse fraction may have a second aerobic plate count, and the second fraction of the coarse fraction may have a third aerobic plate count. In exemplary embodiments, at least one of the second aerobic plate count and the third aerobic plate count may be substantially less than the first aerobic plate count.

In current embodiments, the unmilled grain may have a first coliform plate count, the first fraction of the coarse fraction may have a second coliform plate count, and the second fraction of the coarse fraction may have a third coliform plate count. In exemplary embodiments, at least one of the second coliform plate count and the third coliform plate count may be substantially less than the first coliform plate count.

In further embodiments, the coarse fraction may include: a protein fraction in a proportion of 18% by weight of the coarse fraction, a fat fraction in a proportion of 7% by weight of the coarse fraction, a minerals fraction in a proportion of 6% by weight of the coarse fraction, and an antioxidants fraction having an oxygen radical absorption capacity of at least 7,400 micromole TE/100 g of the coarse fraction.

In additional embodiments, the whole grain flour or the coarse fraction may be a component of a food product. For example, the food product may be a bagel, a biscuit, a bread, a bun, a croissant, a dumpling, an English muffin, a muffin, a pita bread, a quickbread, a refrigerated/frozen dough products, dough, baked beans, a burrito, chili, a taco, a tamale, a tortilla, a pot pie, a ready to eat cereal, a ready to eat meal, stuffing, a microwaveable meal, a brownie, a cake, a cheesecake, a coffee cake, a cookie, a dessert, a pastry, a sweet roll, a candy bar, a pie crust, pie filling, baby food, a baking mix, a batter, a breading, a gravy mix, a meat extender, a meat substitute, a seasoning mix, a soup mix, a gravy, a roux, a salad dressing, a soup, sour cream, a noodle, a pasta, ramen noodles, chow mein noodles, lo mein noodles, an ice cream inclusion, an ice cream bar, an ice cream cone, an ice cream sandwich, a cracker, a crouton, a doughnut, an egg roll, an extruded snack, a fruit and grain bar, a microwaveable snack product, a nutritional bar, a pancake, a par-baked bakery product, a pretzel, a pudding, a granola-based product, a snack chip, a snack food, a snack mix, a waffle, a pizza crust, animal food or pet food. In current embodiments, food products which include the whole grain flour or coarse fraction of the present invention may have an organoleptic profile substantially similar to a same food product made from the refined flour constituent in the absence of the coarse fraction. It is further contemplated that the whole grain flour or coarse fraction of the present invention may also be used as a means to increase the nutritional content of products that do not ordinarily contain grain flour.

In alternative embodiments, the whole grain flour or coarse fraction may be a component of a nutritional supplement. For instance, the nutritional supplement may be a product that is added to the diet containing one or more ingredients, typically including: vitamins, minerals, herbs, amino acids, enzymes, antioxidants, herbs, spices, probiotics, extracts, prebiotics and fiber. The whole grain flour or coarse fraction of the present invention includes vitamins, minerals, amino acids, enzymes, and fiber. For instance, the coarse fraction contains a concentrated amount of dietary fiber as well as other essential nutrients, such as B-vitamins, selenium, chromium, manganese, magnesium, and antioxidants, which are essential for a healthy diet. For example 22 grams of the coarse fraction of the present invention delivers 33% of an individual's daily recommend consumption of fiber. Further, 14 grams is all that is needed to deliver 20% of an individuals daily recommend consumption of fiber. Thus, the coarse fraction is an excellent supplemental source for consumption of an individual's fiber requirement. Therefore, in a present embodiment, the whole grain flour or coarse fraction may be a component of a nutritional supplement.

In a further embodiment, the nutritional supplement may include any known nutritional ingredients that will aid in the overall health of an individual, examples include but are not limited to vitamins, minerals, other fiber components, fatty acids, antioxidants, amino acids, peptides, proteins, lutein, ribose, omega-3 fatty acids, and/or other nutritional ingredients. Because of the high nutritional content of the coarse fraction of the present invention, there may be many uses of the coarse fraction beyond food that confer numerous benefits to an individual, including, delivery of fiber and other essential nutrients, increased digestive function and health, weight management, blood sugar management, heart health, diabetes risk reduction, potential arthritis risk reduction, and overall health and wellness for an individual.

In current embodiments, the nutritional supplement may further include a nutritive constituent. The nutritive constituent may have a first oxygen radical absorption capacity, the coarse fraction may have a second oxygen radical absorption capacity of at least 7,400 micromole TE/100 g of the coarse fraction and the nutritional supplement may have a third oxygen radical absorption capacity, the third oxygen radical absorption capacity being greater than the first oxygen radical absorption capacity. In further embodiments, the nutritive constituent may have a first fiber content in a first proportion by weight of the nutritive constituent, the coarse fraction may have a second fiber content of at least substantially 20% by weight of the coarse fraction (for instance, 38-40% for a whole wheat coarse fraction) and the nutritional supplement may have a third fiber content in a second proportion by weight of the nutritional supplement, wherein the second proportion is greater than the first proportion. Still further, the nutritive constituent may have a first calorie density and the nutritional supplement may have a second calorie density, the second calorie density being less than the first calorie density.

In exemplary embodiments, the nutritive constituent may have a first protein content in a first proportion by weight of the nutritive constituent, the coarse fraction may have a second protein content of at least substantially 12% by weight of the coarse fraction and the nutritional supplement may have a third protein content in a second proportion by weight of the nutritional supplement, wherein the second proportion is greater than the first proportion. In further embodiments, the nutritive constituent may have a first carbohydrate content and the nutritional supplement may have a second carbohydrate content, the second carbohydrate content being less than the first carbohydrate content.

In present embodiments, the whole grain flour or coarse fraction may be a component of a dietary supplement. The Code of Federal Regulations defines a dietary supplement as a product that is intended to supplement the diet and contains one or more dietary ingredients including: vitamins, minerals, herbs, botanicals, amino acids, and other substances or their constituents; is intended to be taken by mouth as a pill, capsule, tablet, or liquid; and is labeled on the front panel as being a dietary supplement.

In additional embodiments, the whole grain flour or coarse fraction may be a fiber supplement or a component thereof. Many current fiber supplements such as psyllium husks, cellulose derivatives, and hydrolyzed guar gum have limited nutritional value beyond their fiber content. Additionally, many fiber supplements have a undesirable texture and poor taste. Fiber supplements made from the whole grain flour or coarse fraction may help deliver fiber as well as protein, and antioxidants. The fiber supplement may be delivered in, but is not limited to the following forms: instant beverage mixes, ready-to-drink beverages, nutritional bars, wafers, cookies, crackers, gel shots, capsules, chews, chewable tablets, and pills. One embodiment delivers the fiber supplement in the form of a flavored shake or malt type beverage, this embodiment may be particularly attractive as a fiber supplement for children.

In current embodiments, the whole grain flour or coarse fraction may be included as a component of a digestive supplement. For instance, the whole grain flour or coarse fraction may be a component of a digestive supplement in combination with one or more prebiotic compounds and/or probiotic organisms. Prebiotic compounds are non-digestible food ingredients that may beneficially affect the host by selectively stimulating the growth and/or the activity of a limited number of microorganisms in the colon. Scientific evidence shows that consumption of prebiotic constituents in sufficient quantities may help manage digestive health, increase mineral absorption for bone health and improve immune function. Examples of prebiotic compounds within the scope of the present invention, may include, but are not limited to: oligosaccharides and inulins. Probiotics are microorganisms which, when administered in adequate amounts, confer a health benefit on the host. Examples of probiotic organisms within the scope of the present invention may include, but are not limited to: *Lactobacillus, Bifidobacteria, Escherichia, Clostridium, Lactococcus, Streptococcus, Enterococcus*, and *Saccharomyces*. In an exemplary embodiment the whole grain flour or coarse fraction may be a component of a digestive supplement which includes the probiotic organism, *Lactobacillus* GG (LGG). The combination of the whole grain flour or coarse fraction of the present invention and LGG produces a digestive supplement that may aid in overall digestive functions, may be used to improve overall health.

In further embodiments, the whole grain flour or coarse fraction may be included as a component of a functional food. The Institute of Food Technologists defines functional foods as, foods and food components that provide a health benefit beyond basic nutrition. This includes conventional foods, fortified, enriched, or enhanced foods, and dietary supplements. The whole grain flour and coarse fraction include numerous vitamins and minerals, have high oxygen radical absorption capacities, and are high in fiber, making them ideally suited for use in/as a functional food. Functional foods within the scope of the present invention may include, but are not limited to, one or more of the following: a bagel, a biscuit, a pudding, a bread, a bun, a croissant, a dumpling, an English muffin, a muffin, a pita bread, a quickbread, a refrigerated/frozen dough products, dough, baked beans, a burrito, chili, a taco, a tamale, a tortilla, a pot pie, a ready to eat cereal, a ready to eat meal, stuffing, a microwaveable meal, a brownie, a cake, a cheesecake, a coffee cake, a cookie, a dessert, a pastry, a sweet roll, a candy bar, a pie crust, pie filling, baby food, a baking mix, a batter, a breading, a gravy mix, a meat extender, a meat substitute, a seasoning mix, a soup mix, a gravy, a roux, a salad dressings, a soup, sour cream, a noodle, a pasta, ramen noodles, chow mein noodles, lo mein noodles, an ice cream inclusion, an ice cream bar, an ice cream cone, an ice cream sandwich, a cracker, a crouton, a doughnut, an egg roll, an extruded snack, a fruit and grain bar, a microwaveable snack product, a nutritional bar, a pancake, a par-baked bakery product, a pretzel, a snack chip, a snack food, a snack mix, a waffle, a pizza crust.

In exemplary embodiments, the whole grain flour or coarse fraction may be used in medical foods. Medical food is defined as a food that is formulated to be consumed or administered entirely under the supervision of a physician and which is intended for the specific dietary management of a disease or condition for which distinctive nutritional requirements, based on recognized scientific principles, are established by medical evaluation. The nutrient contents and antioxidant capacities of the whole grain flour and coarse fraction make them ideal for use in medical foods.

In additional embodiments, the whole grain flour or coarse fraction may also be used in pharmaceuticals. The whole grain flour and coarse fraction are high in fiber and have a very fine granulation making them suitable for use as a carrier in pharmaceuticals.

In current embodiments, delivery of the whole grain flour or coarse fraction as a nutritional supplement, dietary supplement or digestive supplement is contemplated via delivery mechanisms where the whole grain flour or coarse fraction is the single ingredient or one of many nutritional ingredients. Examples of delivery mechanisms include but are not limited to: instant beverage mixes, ready-to-drink beverages, nutritional bars, wafers, cookies, crackers, gel shots, capsules, and chews.

A current embodiment of the present invention is directed to a grain product. For example, the grain product may include a first fraction including bran, the first fraction being milled to a particle size of less than 500 micrometers. The grain product may further include a second fraction including germ, the second fraction being milled to a particle size of less than 500 micrometers. In exemplary embodiments, the grain product may be at least one of: a food product, a nutritional supplement, a dietary supplement, a fiber supplement, a digestive supplement, a functional food and a medical food, each of which is described above.

In an additional embodiment, a milling process may be used to make a multi-grain flour, multi-wheat flour, or a multi-grain coarse fraction. For example, bran and germ from one type of wheat may be ground and blended with ground endosperm or whole grain wheat flour of another type of wheat. Alternatively bran and germ of one type of grain may be ground and blended with ground endosperm or whole grain flour of another type of grain. In an additional embodiment, bran and germ from a first type of wheat or grain may be blended with bran and germ from a second type of wheat or grain to produce a multi-grain coarse fraction. It is contemplated that the present invention encompasses mixing any combination of one or more of bran, germ, endosperm, and whole grain flour of one or more grains. This multi-grain, multi-wheat approach may be used to make custom flour and capitalize on the qualities and nutritional contents of multiple types of grains or wheats to make one flour.

The whole grain flour of the present invention may be produced via a variety of milling processes. An exemplary embodiment of such a process is depicted in FIG. 11 and involves grinding grain in a single stream without separating endosperm, bran, and germ of the grain into separate streams. Clean and tempered grain is conveyed to a first passage grinder, such as a hammermill, roller mill, pin mill, impact mill, disc mill, air attrition mill, gap mill, or the like. In one embodiment, the grinder may be a gap mill. After grinding, the grain is discharged and conveyed to a sifter. Any sifter known in the art for sifting a ground particle may be used. Material passing through the screen of the sifter is the whole grain flour of the present invention and requires no further processing. Material that remains on the screen is referred to as a second fraction. The second fraction requires additional particle reduction. Thus, this second fraction may be conveyed to a second passage grinder. After grinding, the second fraction may be conveyed to a second sifter. Material passing through the screen of the second sifter is the whole grain flour of the present invention. The material that remains on the screen is referred to as the fourth fraction and requires further processing to reduce the particle size. The fourth fraction on the screen of the second sifter is conveyed back into either the first passage grinder or the second passage grinder for further processing via a feedback loop. In an alternative embodiment of the invention, the process may include a plurality of first pass grinders to provide a higher system capacity.

It is contemplated that the whole grain flour, coarse fraction and/or grain products of the present invention may be produced by a number of milling processes, including, but not limited to, those milling processes described herein and those milling processes set forth in U.S. Provisional Application No. 60/732,046 entitled: "A Process For Producing An Ultrafiber Product and Health and Wellness Products Thereof," filed Nov. 1, 2005, and U.S. patent application Ser. Nos. 10/738,732, 10/945,199 and 11/211,864 filed on Dec. 17, 2003, Sep. 20, 2004 and Aug. 25, 2005 respectively, each entitled: "A Process for Producing an Ultrafine-Milled Whole-Grain Wheat Flour and Products Thereof," each of the above-referenced applications being herein incorporated by reference in their entireties (See also: the Cross-Reference section above). In an embodiment, the yield is between about 97% and about 100% of the entire wheat kernel, other than moisture. Further, it is contemplated that the whole grain flour, coarse fraction and/or grain products of the present invention may be modified or enhanced by way of numerous other processes such as: fermentation, instantizing, extrusion, encapsulation, toasting, roasting, or the like.

As discussed above, the coarse fraction or the whole grain flour of the present invention may be used to replace refined wheat flour in the preparation of commercial products. For instance, by replacing between 20%-25% of the refined wheat flour with the coarse fraction of the present invention, the nutritional value of the refined wheat flour products may be increased to levels equal to the nutritional value of products made from whole grain wheat flour. For example, products made with the coarse fraction have the benefit of higher fiber, protein, lipids, vitamins, minerals, antioxidants and phytonutrient concentrations compared to products made from refined wheat flour. Further, such products will have less available carbohydrates and a lower calorie density than products made from refined flour. Such replacement has minimal effect on the texture and appearance of the products (i.e., allows the products to retain texture and appearance more similar to refined flour products). While any variety of wheat can be used, the use of white wheat varieties yield a product appearance more similar to products made with refined wheat flour, since white wheat has a lighter colored bran. In alternative embodiments, the nutritional value of the commercial products may be enhanced beyond that of whole grain wheat by replacing up to 100% of the refined flour with the coarse fraction of the present invention. In further embodiments, less than 20-25% of the refined flour may be replaced with the coarse fraction, yielding a product more nutritious than refined flour but less nutritious than whole grain flour. As previously discussed, the coarse fraction of the present invention may be used to replace refined wheat flour or whole grain wheat flour in numerous bakery, snack and food products. A number of examples of such products are set forth below.

EXAMPLES

Example 1

Replacing 20-25% of refined wheat flour by weight with an equal weight of the coarse fraction for use in bagels increases the fiber, protein content, and antioxidant capacity of the bagels, while reducing the calorie density and carbohydrate content of the bagels.

Example 2

Replacing 20-25% of refined wheat flour by weight with an equal weight of the coarse fraction for use in biscuits increases the fiber, protein content, and antioxidant capacity of the biscuits, while reducing the calorie density and carbohydrate content of the biscuits.

Example 3

Replacing 20-25% of refined wheat flour by weight with an equal weight of the coarse fraction for use in bread increases the fiber, protein content, and antioxidant capacity of the bread, while reducing the calorie density and carbohydrate content of the bread.

Example 4

Replacing 20-25% of refined wheat flour by weight with an equal weight of the coarse fraction for use in buns increases the fiber, protein content, and antioxidant capacity of the buns, while reducing the calorie density and carbohydrate content of the buns.

Example 5

Replacing 20-25% of refined wheat flour by weight with an equal weight of the coarse fraction for use in croissant increases the fiber, protein content, and antioxidant capacity of the croissant, while reducing the calorie density and carbohydrate content of the croissant.

Example 6

Replacing 20-25% of refined wheat flour by weight with an equal weight of the coarse fraction for use in dumplings increases the fiber, protein content, and antioxidant capacity of the dumplings, while reducing the calorie density and carbohydrate content of the dumplings.

Example 7

Replacing 20-25% of refined wheat flour by weight with an equal weight of the coarse fraction for use in English muffins increases the fiber, protein content, and antioxidant capacity of the English muffins, while reducing the calorie density and carbohydrate content of the English muffins.

Example 8

Replacing 20-25% of refined wheat flour by weight with an equal weight of the coarse fraction for use in muffins increases the fiber, protein content, and antioxidant capacity of the muffins, while reducing the calorie density and carbohydrate content of the muffins.

Example 9

Replacing 20-25% of refined wheat flour by weight with an equal weight of the coarse fraction for use in pita bread increases the fiber, protein content, and antioxidant capacity of the pita bread, while reducing the calorie density and carbohydrate content of the pita bread.

Example 10

Replacing 20-25% of refined wheat flour by weight with an equal weight of the coarse fraction for use in quickbreads increases the fiber, protein content, and antioxidant capacity of the quickbreads, while reducing the calorie density and carbohydrate content of the quickbreads.

Example 11

Replacing 20-25% of refined wheat flour by weight with an equal weight of the coarse fraction for use in refrigerated/frozen dough productss increases the fiber, protein content, and antioxidant capacity of the refrigerated/frozen dough productss, while reducing the calorie density and carbohydrate content of the refrigerated/frozen dough productss.

Example 12

Replacing 20-25% of refined wheat flour by weight with an equal weight of the coarse fraction for use in dough increases the fiber, protein content, and antioxidant capacity of the dough, while reducing the calorie density and carbohydrate content of the dough.

Example 13

Replacing 20-25% of refined wheat flour by weight with an equal weight of the coarse fraction for use in baked beans increases the fiber, protein content, and antioxidant capacity of the baked beans, while reducing the calorie density and carbohydrate content of the baked beans.

Example 14

Replacing 20-25% of refined wheat flour by weight with an equal weight of the coarse fraction for use in burritos increases the fiber, protein content, and antioxidant capacity of the burritos, while reducing the calorie density and carbohydrate content of the burritos.

Example 15

Replacing 20-25% of refined wheat flour by weight with an equal weight of the coarse fraction for use in chili increases the fiber, protein content, and antioxidant capacity of the chili, while reducing the calorie density and carbohydrate content of the chilli.

Example 16

Replacing 20-25% of refined wheat flour by weight with an equal weight of the coarse fraction for use in tacos increases the fiber, protein content, and antioxidant capacity of the tacos, while reducing the calorie density and carbohydrate content of the tacos.

Example 17

Replacing 20-25% of refined wheat flour by weight with an equal weight of the coarse fraction for use in tamales increases the fiber, protein content, and antioxidant capacity of the tamales, while reducing the calorie density and carbohydrate content of the tamales.

Example 18

Replacing 20-25% of refined wheat flour by weight with an equal weight of the coarse fraction for use in tortillas increases the fiber, protein content, and antioxidant capacity of the tortillas, while reducing the calorie density and carbohydrate content of the tortillas.

Example 19

Replacing 20-25% of refined wheat flour by weight with an equal weight of the coarse fraction for use in pot pie increases the fiber, protein content, and antioxidant capacity of the pot pie, while reducing the calorie density and carbohydrate content of the pot pie.

Example 20

Replacing 20-25% of refined wheat flour by weight with an equal weight of the coarse fraction for use in ready to eat cereal increases the fiber, protein content, and antioxidant capacity of the ready to eat cereal, while reducing the calorie density and carbohydrate content of the ready to eat cereal.

Example 21

Replacing 20-25% of refined wheat flour by weight with an equal weight of the coarse fraction for use in ready to eat meals increases the fiber, protein content, and antioxidant capacity of the ready to eat meals, while reducing the calorie density and carbohydrate content of the ready to eat meals.

Example 22

Replacing 20-25% of refined wheat flour by weight with an equal weight of the coarse fraction for use in stuffing increases the fiber, protein content, and antioxidant capacity of the stuffing, while reducing the calorie density and carbohydrate content of the stuffing.

Example 23

Replacing 20-25% of refined wheat flour by weight with an equal weight of the coarse fraction for use in microwaveable meals increases the fiber, protein content, and antioxidant capacity of the microwaveable meals, while reducing the calorie density and carbohydrate content of the microwaveable meals.

Example 24

Replacing 20-25% of refined wheat flour by weight with an equal weight of the coarse fraction for use in brownies increases the fiber, protein content, and antioxidant capacity of the brownies, while reducing the calorie density and carbohydrate content of the brownies.

Example 25

Replacing 20-25% of refined wheat flour by weight with an equal weight of the coarse fraction for use in cakes increases the fiber, protein content, and antioxidant capacity of the cakes, while reducing the calorie density and carbohydrate content of the cakes.

Example 26

Replacing 20-25% of refined wheat flour by weight with an equal weight of the coarse fraction for use in cheesecake increases the fiber, protein content, and antioxidant capacity of the cheesecake, while reducing the calorie density and carbohydrate content of the cheesecake.

Example 27

Replacing 20-25% of refined wheat flour by weight with an equal weight of the coarse fraction for use in coffee cakes increases the fiber, protein content, and antioxidant capacity of the coffee cakes, while reducing the calorie density and carbohydrate content of the coffee cakes.

Example 28

Replacing 20-25% of refined wheat flour by weight with an equal weight of the coarse fraction for use in cookies increases the fiber, protein content, and antioxidant capacity of the cookies, while reducing the calorie density and carbohydrate content of the cookies.

Example 29

Replacing 20-25% of refined wheat flour by weight with an equal weight of the coarse fraction for use in desserts increases the fiber, protein content, and antioxidant capacity of the desserts, while reducing the calorie density and carbohydrate content of the desserts.

Example 30

Replacing 20-25% of refined wheat flour by weight with an equal weight of the coarse fraction for use in pastries increases the fiber, protein content, and antioxidant capacity of the pastries, while reducing the calorie density and carbohydrate content of the pastries.

Example 31

Replacing 20-25% of refined wheat flour by weight with an equal weight of the coarse fraction for use in sweet rolls increases the fiber, protein content, and antioxidant capacity of the sweet rolls, while reducing the calorie density and carbohydrate content of the sweet rolls.

Example 32

Replacing 20-25% of refined wheat flour by weight with an equal weight of the coarse fraction for use in candy bars increases the fiber, protein content, and antioxidant capacity of the candy bars, while reducing the calorie density and carbohydrate content of the candy bars.

Example 33

Replacing 20-25% of refined wheat flour by weight with an equal weight of the coarse fraction for use in pie crusts increases the fiber, protein content, and antioxidant capacity of the pie crusts, while reducing the calorie density and carbohydrate content of the pie crusts.

Example 34

Replacing 20-25% of refined wheat flour by weight with an equal weight of the coarse fraction for use in pie fillings increases the fiber, protein content, and antioxidant capacity of the pie fillings, while reducing the calorie density and carbohydrate content of the pie fillings.

Example 35

Replacing 20-25% of refined wheat flour by weight with an equal weight of the coarse fraction for use in baby foods increases the fiber, protein content, and antioxidant capacity of the baby foods, while reducing the calorie density and carbohydrate content of the baby foods.

Example 36

Replacing 20-25% of refined wheat flour by weight with an equal weight of the coarse fraction for use in baby formula increases the fiber, protein content, and antioxidant capacity of the baby formula, while reducing the calorie density and carbohydrate content of the baby formula.

Example 37

Replacing 20-25% of refined wheat flour by weight with an equal weight of the coarse fraction for use in baking mixes increases the fiber, protein content, and antioxidant capacity of the baking mixes, while reducing the calorie density and carbohydrate content of the baking mixes.

Example 38

Replacing 20-25% of refined wheat flour by weight with an equal weight of the coarse fraction for use in batter increases the fiber, protein content, and antioxidant capacity of the batter, while reducing the calorie density and carbohydrate content of the batter.

Example 39

Replacing 20-25% of refined wheat flour by weight with an equal weight of the coarse fraction for use in breadings increases the fiber, protein content, and antioxidant capacity of the breadings, while reducing the calorie density and carbohydrate content of the breadings.

Example 40

Replacing 20-25% of refined wheat flour by weight with an equal weight of the coarse fraction for use in gravy mixes increases the fiber, protein content, and antioxidant capacity of the gravy mixes, while reducing the calorie density and carbohydrate content of the gravy mixes.

Example 41

Replacing 20-25% of refined wheat flour by weight with an equal weight of the coarse fraction for use in meat extenders increases the fiber, protein content, and antioxidant capacity of the meat extenders, while reducing the calorie density and carbohydrate content of the meat extenders.

Example 42

Replacing 20-25% of refined wheat flour by weight with an equal weight of the coarse fraction for use in meat substitutes increases the fiber, protein content, and antioxidant capacity of the meat substitutes, while reducing the calorie density and carbohydrate content of the meat substitutes.

Example 43

Replacing 20-25% of refined wheat flour by weight with an equal weight of the coarse fraction for use in seasoning mixes increases the fiber, protein content, and antioxidant capacity of the seasoning mixes, while reducing the calorie density and carbohydrate content of the seasoning mixes.

Example 44

Replacing 20-25% of refined wheat flour by weight with an equal weight of the coarse fraction for use in soup mix increases the fiber, protein content, and antioxidant capacity of the soup mix, while reducing the calorie density and carbohydrate content of the soup mix.

Example 45

Replacing 20-25% of refined wheat flour by weight with an equal weight of the coarse fraction for use in gravy increases the fiber, protein content, and antioxidant capacity of the gravy, while reducing the calorie density and carbohydrate content of the gravy.

Example 46

Replacing 20-25% of refined wheat flour by weight with an equal weight of the coarse fraction for use in roux increases the fiber, protein content, and antioxidant capacity of the roux, while reducing the calorie density and carbohydrate content of the roux.

Example 47

Replacing 20-25% of refined wheat flour by weight with an equal weight of the coarse fraction for use in salad dressings increases the fiber, protein content, and antioxidant capacity of the salad dressings, while reducing the calorie density and carbohydrate content of the salad dressings.

Example 48

Replacing 20-25% of refined wheat flour by weight with an equal weight of the coarse fraction for use in soups increases the fiber, protein content, and antioxidant capacity of the soups, while reducing the calorie density and carbohydrate content of the soups.

Example 49

Replacing 20-25% of refined wheat flour by weight with an equal weight of the coarse fraction for use in sour cream increases the fiber, protein content, and antioxidant capacity of the sour cream, while reducing the calorie density and carbohydrate content of the sour cream.

Example 50

Replacing 20-25% of refined wheat flour by weight with an equal weight of the coarse fraction for use in noodles increases the fiber, protein content, and antioxidant capacity of the noodles, while reducing the calorie density and carbohydrate content of the noodles.

Example 51

Replacing 20-25% of refined wheat flour by weight with an equal weight of the coarse fraction for use in pasta increases the fiber, protein content, and antioxidant capacity of the pasta, while reducing the calorie density and carbohydrate content of the pasta.

Example 52

Replacing 20-25% of refined wheat flour by weight with an equal weight of the coarse fraction for use in ramen noodles increases the fiber, protein content, and antioxidant capacity of the ramen noodles, while reducing the calorie density and carbohydrate content of the ramen noodles.

Example 53

Replacing 20-25% of refined wheat flour by weight with an equal weight of the coarse fraction for use in chow mein noodles increases the fiber, protein content, and antioxidant capacity of the chow mein noodles, while reducing the calorie density and carbohydrate content of the chow mein noodles.

Example 54

Replacing 20-25% of refined wheat flour by weight with an equal weight of the coarse fraction for use in lo mein noodles increases the fiber, protein content, and antioxidant capacity of the lo mein noodles, while reducing the calorie density and carbohydrate content of the lo mein noodles.

Example 55

Replacing 20-25% of refined wheat flour by weight with an equal weight of the coarse fraction for use in an ice cream inclusion increases the fiber, protein content, and antioxidant capacity of the ice cream inclusion, while reducing the calorie density and carbohydrate content of the ice cream inclusion.

Example 56

Replacing 20-25% of refined wheat flour by weight with an equal weight of the coarse fraction for use in ice cream bars increases the fiber, protein content, and antioxidant capacity of the ice cream bars, while reducing the calorie density and carbohydrate content of the ice cream bars.

Example 57

Replacing 20-25% of refined wheat flour by weight with an equal weight of the coarse fraction for use in ice cream cones increases the fiber, protein content, and antioxidant capacity of the ice cream cones, while reducing the calorie density and carbohydrate content of the ice cream cones.

Example 58

Replacing 20-25% of refined wheat flour by weight with an equal weight of the coarse fraction for use in ice cream sandwiches increases the fiber, protein content, and antioxidant capacity of the ice cream sandwiches, while reducing the calorie density and carbohydrate content of the ice cream sandwiches.

Example 59

Replacing 20-25% of refined wheat flour by weight with an equal weight of the coarse fraction for use in crackers increases the fiber, protein content, and antioxidant capacity of the crackers, while reducing the calorie density and carbohydrate content of the crackers.

Example 60

Replacing 20-25% of refined wheat flour by weight with an equal weight of the coarse fraction for use in croutons increases the fiber, protein content, and antioxidant capacity of the croutons, while reducing the calorie density and carbohydrate content of the croutons.

Example 61

Replacing 20-25% of refined wheat flour by weight with an equal weight of the coarse fraction for use in doughnuts increases the fiber, protein content, and antioxidant capacity of the doughnuts, while reducing the calorie density and carbohydrate content of the doughnuts.

Example 62

Replacing 20-25% of refined wheat flour by weight with an equal weight of the coarse fraction for use in egg rolls increases the fiber, protein content, and antioxidant capacity of the egg rolls, while reducing the calorie density and carbohydrate content of the egg rolls.

Example 63

Replacing 20-25% of refined wheat flour by weight with an equal weight of the coarse fraction for use in extruded snacks increases the fiber, protein content, and antioxidant capacity of the extruded snacks, while reducing the calorie density and carbohydrate content of the extruded snacks.

Example 64

Replacing 20-25% of refined wheat flour by weight with an equal weight of the coarse fraction for use in fruit and grain bars increases the fiber, protein content, and antioxidant capacity of the fruit and grain bars, while reducing the calorie density and carbohydrate content of the fruit and grain bars.

Example 65

Replacing 20-25% of refined wheat flour by weight with an equal weight of the coarse fraction for use in microwaveable snack products increases the fiber, protein content, and antioxidant capacity of the microwaveable snack products, while reducing the calorie density and carbohydrate content of the microwaveable snack products.

Example 66

Replacing 20-25% of refined wheat flour by weight with an equal weight of the coarse fraction for use in nutritional bar increases the fiber, protein content, and antioxidant capacity of the nutritional bar, while reducing the calorie density and carbohydrate content of the nutritional bar.

Example 67

Replacing 20-25% of refined wheat flour by weight with an equal weight of the coarse fraction for use in pancakes increases the fiber, protein content, and antioxidant capacity of the pancakes, while reducing the calorie density and carbohydrate content of the pancakes.

Example 68

Replacing 20-25% of refined wheat flour by weight with an equal weight of the coarse fraction for use in par-baked bakery products increases the fiber, protein content, and antioxidant capacity of the par-baked bakery products, while reducing the calorie density and carbohydrate content of the par-baked bakery products.

Example 69

Replacing 20-25% of refined wheat flour by weight with an equal weight of the coarse fraction for use in pretzels increases the fiber, protein content, and antioxidant capacity of the pretzels, while reducing the calorie density and carbohydrate content of the pretzels.

Example 70

Replacing 20-25% of refined wheat flour by weight with an equal weight of the coarse fraction for use in snack chips increases the fiber, protein content, and antioxidant capacity of the snack chips, while reducing the calorie density and carbohydrate content of the snack chips.

Example 71

Replacing 20-25% of refined wheat flour by weight with an equal weight of the coarse fraction for use in snack food increases the fiber, protein content, and antioxidant capacity of the snack food, while reducing the calorie density and carbohydrate content of the snack food.

Example 72

Replacing 20-25% of refined wheat flour by weight with an equal weight of the coarse fraction for use in snack mixes increases the fiber, protein content, and antioxidant capacity of the snack mixes, while reducing the calorie density and carbohydrate content of the snack mixes.

Example 73

Replacing 20-25% of refined wheat flour by weight with an equal weight of the coarse fraction for use in waffles increases the fiber, protein content, and antioxidant capacity of the waffles, while reducing the calorie density and carbohydrate content of the waffles.

Example 74

Replacing 20-25% of refined wheat flour by weight with an equal weight of the coarse fraction for use in pizza crusts increases the fiber, protein content, and antioxidant capacity of the pizza crusts, while reducing the calorie density and carbohydrate content of the pizza crusts.

Example 75

The coarse fraction can be mixed with a *Lactobacillus* species with probiotic properties and other prebiotic compounds to form a nutritional supplement which improves the health of the digestive system.

Example 76

The coarse fraction can be used in both dietary and nutritional supplements. The fiber content, protein content, and oxygen radical absorption capacity make the coarse fraction an ideal ingredient in nutritional and dietary supplements.

Example 77

The coarse fraction can be used as an ingredient in nutritional beverages. The fiber content, protein content and oxygen radical absorption capacity make the coarse fraction an ideal ingredient in sport drinks and dietary drinks.

Example 78

The coarse fraction can be used in appropriate proportions as an ingredient in cookies or wafers to be consumed as a fiber supplement.

Example 79

The coarse fraction can be encapsulated or made into pills, chewable tablets or capsules and used as a dietary fiber supplement.

Example 80

A beverage mix may include 15 grams of the milled coarse fraction. The mix may further include a *Lactobacillus* GG starter culture (freeze-dried) in an amount to provide 10 billion cfu (colony forming units) per serving. The mix may further include 5 grams of fructooligosaccharides. The beverage mix may also be formulated with sugar, nonfat dry milk, cocoa powder and other flavoring ingredients. The end result is a dry beverage mix that can be mixed with water or other liquids of choice. The beverage mix can be packaged as individual servings into sachets having sufficient moisture-barrier properties to help maintain viability of the probiotic organism. This beverage mix provides 40% of the daily value of dietary fiber.

Other variations or modifications of the above-disclosed embodiments which will be obvious to those skilled in the art are within the scope and teachings of this invention. The quantity of the coarse fraction used in the embodiments can be varied to give the products the desired nutritional characteristics, taste, and aesthetic appearance.

What is claimed is:

1. A coarse fraction produced from cleaned wheat kernels comprising:
   primarily bran and germ; and
   a particle size distribution such that at least 98 wt % of the coarse fraction is less than or equal to 212 μm.

2. The coarse fraction of claim 1 wherein the coarse fraction comprises at least 97 wt % bran and germ.

3. The coarse fraction of claim 1 wherein the coarse fraction comprises substantially the same ratio of bran to germ as the cleaned wheat kernels.

4. The coarse fraction of claim 1 wherein at least 96 wt % of the coarse fraction has a particle size less than or equal to 150 μm.

5. The coarse fraction of claim 1 wherein enzymes in the bran and germ are inactivated to stabilize the whole grain wheat flour.

6. The coarse fraction of claim 1 wherein the coarse fraction has an oxygen radical absorption capacity of at least 7,400 micromole TE/100 g.

7. A whole grain wheat flour produced from whole grain wheat kernels, the whole grain wheat flour comprising:
   bran, germ, and endosperm;
   a particle size distribution such that at least about 98% of the whole grain wheat flour is less than or equal to about 212 μm; and
   substantially the same proportions of natural constituents, other than moisture, as compared to a representative sample of the whole grain wheat kernels.

8. The whole grain wheat flour of claim 7 wherein at least about 98% of the whole-grain wheat flour has a particle size less than or equal to about 150 μm.

9. The whole grain wheat flour of claim 7 wherein the whole grain wheat flour comprises at least about 97 wt % of the natural constituents, other than moisture, in the representative sample of the whole grain wheat kernels.

10. The whole grain wheat flour of claim 7 wherein the whole grain wheat flour comprises at least about 97 wt % of the bran and germ in the representative sample of the whole grain wheat kernels.

11. A whole grain wheat flour produced from whole grain wheat kernels, the whole grain wheat flour comprising:
   bran, germ, and endosperm;
   a particle size distribution such that at least about 98% of the whole grain wheat flour is less than or equal to about 212 μm; and
   a measured ash value that is substantially the same as a representative ash value for the whole grain wheat kernels.

12. The whole grain wheat flour of claim 11 wherein the whole grain wheat flour comprises at least about 97 wt % of the natural constituents, other than moisture, in a representative sample of the whole grain wheat kernels.

13. The whole grain wheat flour of claim 11 wherein the whole grain wheat flour comprises at least about 97 wt % of the bran and germ in a representative sample of the whole grain wheat kernels.

14. The whole grain wheat flour of claim 11 wherein at least about 98 wt % of the whole grain wheat flour has a particle size less than or equal to about 150 μm.

15. The whole grain wheat flour of claim 11 wherein the measured ash value is at least about 97 wt % of the representative ash value for the whole grain wheat kernels.

16. A whole grain wheat flour produced from whole grain wheat kernels, the whole grain wheat flour comprising:
   bran, germ, and endosperm;
   a particle size distribution such that at least about 98% of the whole grain wheat flour is less than or equal to about 212 μm; and
   substantially all of the bran and germ in the whole grain wheat kernels.

17. The whole grain wheat flour of claim 16 wherein at least about 98% of the whole grain wheat flour has a particle size less than or equal to about 150 μm.

18. The whole grain wheat flour of claim 16 wherein the whole grain wheat flour includes substantially the same proportions of natural constituents, other than moisture, as compared to a representative sample of the whole grain wheat kernels.

19. The whole grain wheat flour of claim 16 wherein the whole grain wheat flour comprises at least about 97 wt % of the natural constituents, other than moisture, in a representative sample of the whole grain wheat kernels.

20. The whole grain wheat flour of claim 16 wherein the whole grain wheat flour comprises at least about 97 wt % of the bran and germ in a representative sample of the whole grain wheat kernels.

* * * * *